Figure 1:
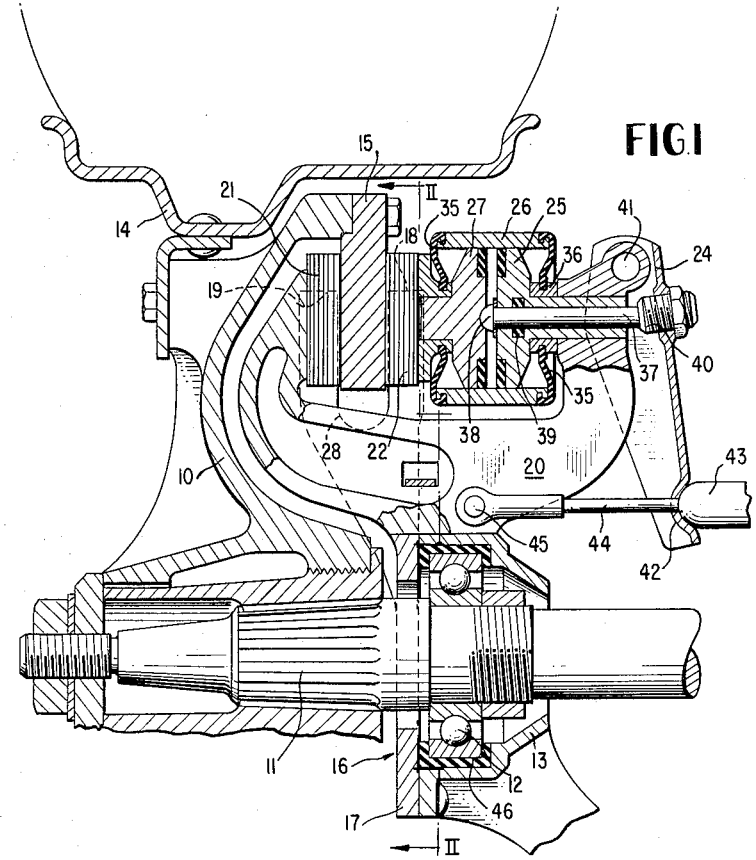

May 3, 1966 J. MÜLLER 3,249,181
SPOT TYPE DISK BRAKE
Filed April 9, 1963 2 Sheets-Sheet 1

INVENTOR.
JOSEF MÜLLER
BY Dicke & Craig
ATTORNEYS

May 3, 1966  J. MÜLLER  3,249,181
SPOT TYPE DISK BRAKE
Filed April 9, 1963  2 Sheets-Sheet 2

INVENTOR.
JOSEF MÜLLER
BY *Dicke & Craig*
ATTORNEYS

** 3,249,181
Patented May 3, 1966**

3,249,181
SPOT TYPE DISK BRAKE
Josef Müller, Stuttgart-Riedenberg, Germany, assignor to Daimler-Benz Aktiengesellschaft, Stuttgart-Unterturkheim, Germany
Filed Apr. 9, 1963, Ser. No. 271,643
Claims priority, application Germany, Apr. 12, 1962, D 38,656
18 Claims. (Cl. 188—73)

The present invention relates to a disk brake for vehicles, especially for motor vehicles, with a brake disk secured within the area of the outer circumference thereof at the wheel to be braked and with a brake clamp surrounding the brake disk on the inside thereof, and in which the leg portions of the brake clamp support the brake blocks together with the brake linings and in which the actuating members thereof are located only on one side of the brake disk, preferably the side facing toward the vehicle, whereby the brake clamp is supported by the axle support or carrier or by some other part of the vehicle which does not rotate.

With a known brake construction of the aforementioned type, the brake blocks are secured inside of the brake disk on bolts of a non-rotatable brake support. Consequently, during braking there occurs in such prior art construction a moment as a result of the brake force acting at the brake blocks whereby the blocks themselves are loaded and stressed, the support thereof on the bolts is very strongly loaded and stressed, and under certain circumstances even the brake clamp itself is loaded and stressed.

The present invention aims at the elimination of the aforementioned disadvantages. The present invention makes use, for purposes of solving this problem, of the general concept to transmit the brake force, which act on the brake blocks, directly at the place of origin thereof from the blocks to a part of the vehicle that does not rotate, i.e., to a relatively stationary vehicle part. For that purpose, the present invention proposes in particular to construct the brake support or carrier supporting the brake clamp as double-fork or double-yoke which surrounds with the leg portions thereof both the brake disk as well as the brake blocks so that each brake block abuts on each side with at least one-half the lateral surface thereof against one of the leg portions of the double-fork.

The construction according to the present invention offers the advantage that the brake force itself is transmitted from the brake blocks directly to the non-rotating or relatively stationary part of the vehicle. With such an arrangement there occurs no moment and no bending, buckling or breaking off about a connecting place necessarily provided with play, and also the surface pressures can be kept within tolerable limits. The movable part of the brake is, therefore, free of these forces. Consequently, the movable part of the brake may be constructed of considerably lighter weight and by itself has no tendency for rattling or excessive wear.

This cannot be maintained, however, of the known prior art arrangements because with such prior art arrangements each time the brake is applied the blocks and to a certain extent also the clamp is pulled or torn about the suspension thereof at the bolts—which necessarily has to be provided with play. This disadvantage is completely dispensed with by the present invention, particularly as the play between the blocks and the arms of the double-forked member may be kept relatively small.

In order to further improve the noiseless suspension of the otherwise movable clamp which automatically adjusts itself according to the brake disk, it is proposed in accordance with the present invention to hold the brake clamp by means of at least one spring in constant abutment against an abutment surface especially provided therefor at the brake or axle support, as to the rest, however, the clamp has sufficient play with respect thereto for purposes of self-adjustment of the block with respect to the brake disk.

The location of the spring and of the abutment surface is determined by the plane in which lies the brake. It is proposed in accordance with the present invention for the preferred case of an upright mounting disposed above the axle that the fork slot extending transversely to the brake disk for the passage of the brake clamp is lower than the slot disposed in the plane of the disk, and that the brake clamp is pressed by means of a leaf spring extending parallelly to the plane of the disk inwardly against the bottom of this slot which serves abutment surface. With another construction of the brake support in accordance with the present invention, the axle support or carrier itself forms the abutment surface.

It is not important, in principle, for the present invention whether the brake support consists of this double-forked member with an adjoining flange-like part and is secured with the aid thereof at the axle support or carrier, or consists of two forked pieces which together form a double fork member and of which each surrounds the brake disk with the leg portions thereof and by itself is secured at the axle support or carrier. The former arrangement may be particularly suited for a rear wheel brake while the latter arrangement may be particularly suited for a front wheel brake.

Known in the prior art are brakes of which the actuating cylinders accommodate two mutually oppositely disposed pistons for the brake blocks. In connection therewith and with the last-described construction of the brake support the present invention proposes to connect the cylinder rigidly with the leg portion of each forked piece disposed on the vehicle interior side. Another possibility exists with the first-mentioned double-fork construction according to the present invention by arranging the double-forked member without connection with a stationary or fixed part in a floating manner on the two actuating pistons.

For the hand brake actuation the present invention proposes that a pressure plunger extends through the inside of the brake clamp and the piston connected therewith with the plunger sealed with respect to the piston, which plunger abuts with the mushroom-shaped head portion thereof against the other actuating piston and is supported externally thereof against a lever of the hand brake actuating mechanism supported in the brake clamp. This actuating lever is constructed at the free end thereof as abutment or counter bearing for the one part of the Bowden cable of which the other part is again secured at the brake clamp member.

The movability proposed in accordance with the present invention between the double-fork-shaped brake support and the brake clamp member is of advantage in particular for certain types of axle or wheel suspensions. In connection therewith, there is additionally proposed in accordance with the present invention to secure the brake support or carrier with the flanged part thereof at an annular part forming the axle carrier or connected therewith which annular part receives within itself the bearing for the axle journal or the shaft. This bearing is arranged with the outer race thereof on an elastic ring made of rubber or of a technically equivalent material. Such an arrangement or also a ball-shaped bearing that may be chosen instead, is of advantage when the instantaneous center of the wheel suspension falls outside the strand line of drive shafts by a certain amount, usually in the downward direction, and certain angular deviations between the wheel shaft and the wheel support occur with avoidance of an external joint within the strand line of the driving connection.

Accordingly, it is an object of the present invention to provide a disk brake for vehicles which avoids the aforementioned shortcomings and inadequacies encountered with the prior art constructions.

Another object of the present invention resides in the provision of a disk brake in which the brake forces as well as any resulting moments are transmitted directly to a relatively fixed part.

Still another object of the present invention resides in the provision of a disk brake for vehicles in which the brake forces are transmitted directly from the brake shoes or blocks to a relatively fixed, non-rotating part of the vehicle.

Still a further object of the present invention resides in the provision of a disk brake for motor vehicles in which the movable part of the brake is free of all brake forces so that it may be constructed of lighter weight than has been possible heretofore.

A further object of the present invention resides in the provision of a disk brake construction for vehicles which minimizes the danger of rattles and, generally speaking, provides a more noiseless suspension and operation of the various parts thereof.

Figure 2:
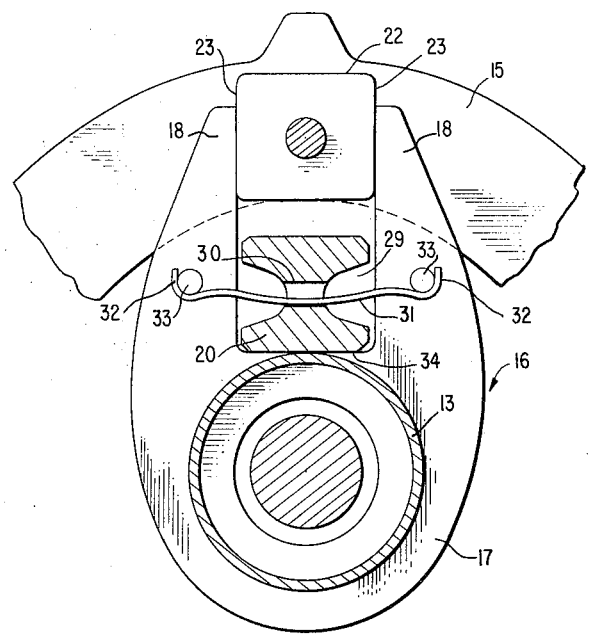
Figure 3:
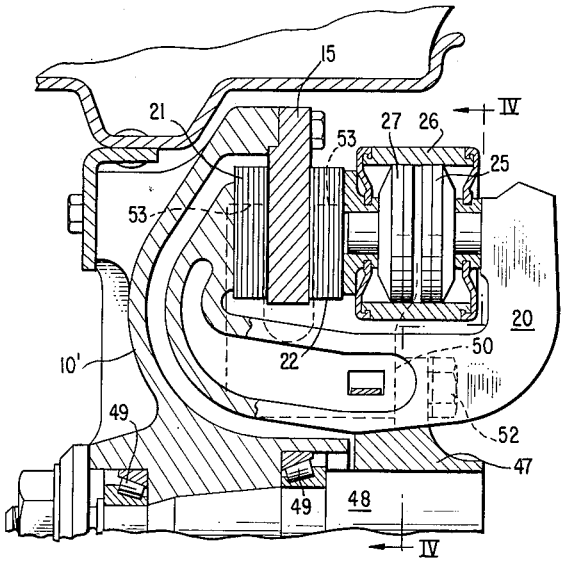
Figure 4:
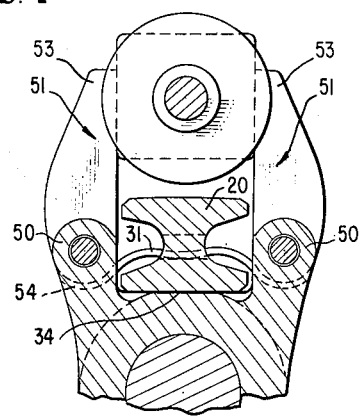
Figure 5:
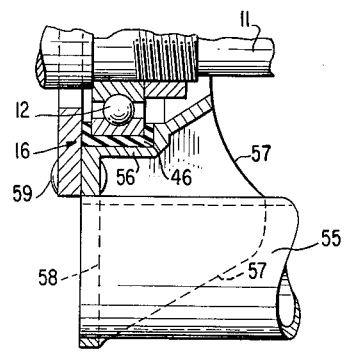

These and other objects, features and advantages of the present invention will be come more obvious from the following description when taken in connection with the accompanying drawing which shows, for purposes of illustration only, several embodiments in accordance with the present invention and wherein:

FIGURE 1 is a partial cross sectional view through a rear-wheel disk brake in accordance with the present invention, FIGURE 2 is a partial cross sectional view taken along line II—II of FIGURE 1, FIGURE 3 is a partial cross sectional view through a front-wheel disk brake in accordance with the present invention, FIGURE 4 is a cross sectional view taken along line IV—IV of FIGURE 3, and FIGURE 5 is a partial cross sectional view through a modified embodiment of an axle support in accordance with the present invention.

Referring now to the drawing wherein like reference numerals are used throughout the various views to designate like parts, and more particularly to FIGURES 1 and 2, the wheel to be braked is designated therein by reference numeral 10. In the illustrated embodiment, the wheel 10 is driven by means of a shaft 11 which is supported within an annular part 13 by means of a bearing 12. The annular part 13 itself forms the axle carrier or axle support or is rigidly secured thereat. A brake disk 15 is secured at the outer circumference thereof at the wheel 10 inside of the wheel felly 14. The brake disk 15 may consist of light metal or a corresponding alloy.

The brake carrier or brake support generally designated by reference numeral 16 is secured at the annular part 13 or at another part of the axle support or carrier. The brake support 16 is provided for that purpose with a flange-like part 17. The flange-like part 17 passes over in the upper portion thereof into a double-forked part of which the two leg portions 18 are disposed on the inside of the brake disk 15 whereas the two leg portions 19 thereof are arranged on the outside of the brake disk 15.

The brake disk 15 is surrounded inwardly thereof by a U-shaped clamp member 20 which, with the end thereof disposed between the wheel and the disk, supports directly a brake shoe or brake block 21 provided with suitable friction lining. The other brake block 22 is disposed on the inside of the brake disk 15. The leg portions 18 and 19 of the double-forked part at the brake support each surround with the lateral surfaces thereof a respective brake block 21 and 22. The brake blocks 21 and 22 are, for that purpose, as may be particularly well seen in FIGURE 2, constructed of approximately square shape and inserted with the lateral surfaces 23 thereof between the leg portions 18 and 19, respectively, of the forked part. The play between the leg portions 18 and 19 and the blocks 21 and 22 may thereby be kept relatively small.

The brake clamp 20 serves at the other end thereof for the pivotal connection of a hand-brake lever 24 which will be described more fully hereinafter. The brake clamp 20 is additionally connected with an actuating piston 25. The actuating piston 25 is arranged within a brake cylinder 26 and is disposed therein directly opposite another actuating piston 27 which is operatively connected with the brake block 22. The brake cylinder 26 together with the two actuating pistons 25 and 27 is disposed on the inside of the vehicle at a relatively well-cooled place thereof.

The slot 28 (FIGURE 1) disposed within the brake support or carrier 16 within the plane of the brake disk for purposes of forming the double-forked part is dependent in its depth on the brake disk itself. The other slot 29 (FIGURE 2) extending transversely to the brake disk 15 is considerably deeper. The slot 29 serves for the passage of the brake clamp 20 through the brake carrier 16. The brake clamp 20 is provided with a slot 30 through which extends a leaf spring 31. The leaf spring 31 is supported with the ends 32 thereof at two pins 33 of the brake support or carrier 16 or in any other suitable manner. The brake clamp 20 is normally pressed in the downward direction against the bottom or connecting portion 34 of the slot 29 by this leaf spring 31 so that the bottom 34 serves as abutment surface for the brake clamp 20. A further securing means, not illustrated in detail herein, may be additionally provided which extends within a plane transverse to the brake disk.

As already mentioned hereinabove, the brake cylinder 26 is arranged floatingly on the two actuating pistons 25 and 27. The brake cylinder 26 is constructed laterally without lids or covers and is provided in the center between both pistons 25 and 27 with a connection (not shown) for the pressure medium. The packings 35 made of rubber or a technically equivalent material, which surround the cylinder 26 on the outside thereof and are sealingly secured along the inner circumference on the piston rods or on special intermediate rings 36, form the lateral closures for the cylinder 26.

For purposes of braking, brake fluid under pressure is supplied, in the usual manner, to the center of the brake cylinder 26. Both actuating pistons 25 and 27 are thereby spread apart and the brake blocks 21 and 22 are, as a result thereof, pressed firmly against the brake disk 15. The brake blocks 21 and 22 including the brake clamp 20, the cylinder 26 as well as the actuating pistons 25 and 27 and all of the parts connected therewith thereby align themselves according to the brake disk 15 whereby the spring 31 yields correspondingly, if necessary.

The brake moment is transmitted from the lateral surfaces 23 of the brake blocks 21 and 22 directly to the leg portions 18 and 19 of the double-fork-shaped brake support or carrier 16. The leg portions 18 and 19, as considered in the radial direction, extend at least up to half the height of the brake blocks 21 and 22, preferably, however, somewhat therebeyond. As a result thereof, the transmission of force from the brake blocks 21 and 22 to the brake support or carrier 16 takes place without any buckling or bending moment, that is, the axle support or carrier has to absorb directly the brake moment. The brake clamp, pistons, brake blocks, etc. remain free of the brake moment, though, of course, the latter have to be able to absorb with the lateral surfaces thereof the surface pressures.

For purposes of actuating the hand brake, a pressure plunger 37 extends centrally through the brake clamp 20 and the actuating piston 25. The plunger 37 abuts with the mushroom-shaped head portion 38 thereof against the oppositely disposed actuating piston 27. The pressure plunger 37 is sealed by means of a seal 39 with respect to the actuating piston 25. The pressure plunger 37 abuts with the outer end thereof against a possibly adjustable abutment 40 in the form of a threaded plug provided within the hand-brake lever 24. The hand-brake lever 24 is rotatably or pivotally supported at 41, as already mentioned hereinabove, at the brake clamp 20 and forms with the long lever arm thereof a counter bearing or abutment 42 for the tubing 43 of the Bowden cable of the hand brake. The core 44 of this Bowden cable is secured at 45 at the brake clamp 20.

During actuating of the hand brake, the lever 24 rotates in the clockwise direction about its bearing 41 and the pressure plunger 37 thereby presses against the piston 27 whereby the brake clamp 20 again serves as counter bearing. This produces the same effect as if the two actuating pistons 25 and 27 had been spread apart by the pressure of the brake fluid.

In the described disk brake, the brake clamp 20, since it is not stressed or loaded by large forces, may be constructed of very light weight and may also be displaced relatively far into the wheel plane. This is very desirable with certain types of axle or wheel suspensions. Since with these types of axle suspensions certain angular deviations may occur between the wheel shaft and wheel bearing, the bearing 12 is supported within the annular part 13 with the outer race thereof on an elastic ring 46 made of rubber or the like or is also constructed externally of ball-like shape.

The embodiment illustrated in FIGURES 3 and 4 illustrates, in principle, a similar disk brake in which an axle journal or stub 48 is non-rotatably supported within the axle support or carrier 47, the axle journal or stub 48 carries thereby the wheel 10' by means of two bearings 49. The axle support or carrier 47 is provided with two upwardly directed eye portions 50. The brake support or carrier consists in this embodiment of two individual forked pieces generally designated by reference numerals 51 which are secured, each by itself, at these eye portions 50 by means of bolts or screws 52 and which together form a double-forked member. Abutment surfaces or guide pins (not shown in detail) may be provided thereby.

Each of these forked pieces 51 surrounds with the two leg portions 53 thereof the brake disk 15 in the manner already described hereinabove. The brake blocks 21 and 22 are arranged in the manner already described hereinabove, between two leg portions 53 disposed on the same side of the brake disk. The construction of the brake clamp 20, of the aforementioned brake blocks 21 and 22, and of the actuating pistons 25 and 27 is, in principle, the same as with the embodiment of FIGURES 1 and 2.

Differing therefrom, however, is the fact that the brake cylinder 26 is securely connected with both forked pieces 51 of the brake support or carrier and these parts are thereby combined into a unitary brake support rigid in itself. Also in this embodiment the brake clamp 20 is again pressed by means of a spring 31 against an abutment surface 34 which may be formed by the axle support or carrier 47 itself. The leaf spring 31 may, in this case, abut with the ends 54 thereof directly from below against the eye portions 50 of the axle support 47 or within corresponding apertures or cut-outs provided in these eye portions 50, it is, however, understood that the arrangement of securing pins for the spring 31 corresponding to the embodiment of FIGURES 1 and 2 is not precluded with the embodiment of FIGURES 3 and 4.

According to FIGURE 5 a cross bearer 55 having a box-shaped or circular cross-section is combined at the end thereof with the annular part 56 into an axle carrier closed upon itself. Corresponding sheet metal elements 57 and 58 thereby serve as reinforcements and lateral closure. The drive shaft 11 is supported within the annular part 56 on the bearing 12 which again may be supported externally thereof by a ball-shaped structure or within a rubber ring 46. The brake support or carrier generally designated by reference numeral 16 is secured, for example, by means of bolts or screws 59 at this unitary axle carrier 55. The brake support or carrier 59 and the brake itself may thereby be constructed according to FIGURES 1 and 2.

While I have shown and described several embodiments in accordance with the present invention, it is understood that the same is not limited thereto but is susceptible of numerous changes and modifications within the spirit and scope of a person skilled in the art and I, therefore, do not wish to be limited to the details shown and described herein but intend to cover all such changes and modifications as are encompassed by the scope of the appended claims.

I claim:
1. A disk brake for braking the wheel of a vehicle, especially for motor vehicles, comprising:
  brake disk means having an inner and an outer circumference and being adapted to be secured within the area of said outer circumference at the wheel to be braked,
  brake clamp means surrounding said brake disk means inwardly thereof,
  brake block means provided with brake lining means,
  said brake clamp means including leg portions supporting said brake block means, one of said leg portions comprising a portion disposed radially inward of said inner circumference,
  actuating means for said brake block means disposed only on one side of said brake disk means,
  a relatively fixed part for supporting thereon the brake clamp means,
  and connecting means for supporting said brake clamp means at said relatively fixed part including double-forked means provided with further leg portions two of said further leg portions being joined by a connecting portion, effectively surrounding the brake disk means as well as the brake block means so that each brake block means abuts on each side thereof with at least about half of the lateral surfaces thereof against one of said last-mentioned further leg portions, and a flange-like part adjoining directly said double-forked means, said connecting means being secured at said relatively fixed part with the aid of said flange-like part, and spring means urging said brake clamp means against said connecting portion,
2. A disk brake for braking the wheel of a vehicle, especially for motor vehicles, comprising:
  brake disk means having an inner and an outer circumference and being adapted to be secured within the area of said outer circumference at the wheel to be braked,
  brake clamp means surrounding said brake disk means inwardly thereof,
  brake block means provided with brake lining means,
  said brake clamp means including leg portions supporting said brake block means, one of said leg portions comprising a portion disposed radially inward of said inner circumference,
  actuating means for said brake block means disposed only on one side of said brake disk means,
  a relatively fixed part for supporting thereon the brake clamp means,
  and connecting means for supporting said brake clamp means at said relatively fixed part including double-forked means consisting of two forked pieces together forming the double-forked means and provided with further leg portions, two of said further leg portions being joined by a connecting portion, said double-forked means, effectively surrounding the brake disk means as well as the brake block means so that each brake block means abuts on each side thereof with at least about half of the lateral surfaces thereof against one of said last-mentioned further leg portions, each forked piece being separately secured to said relatively fixed part and surrounding with the leg portions thereof said brake disk means, and spring means urging said brake clamp means in a direction radial of said disk means and against said connecting portion.

3. A disk brake for braking the wheel of a vehicle, especially for motor vehicles, comprising:
brake disk means adapted to be secured within the area of the outer circumference thereof at the wheel to be braked,
brake clamp means surrounding said brake disk means inwardly thereof,
brake block means provided with brake lining means,
said brake clamp means including leg portions supporting said brake block means,
actuating means for said brake block means disposed only on one side of said brake disk means including cylinder means slidingly receiving therein two mutually oppositely disposed piston means, said cylinder means being mounted floatingly on said piston means free of any connection with a relatively fixed part,
a relatively fixed part for supporting thereon the brake clamp means,
and connecting means for supporting said brake clamp means at said relatively fixed part including a plurality of double-forked means provided with further leg portions, two of said further leg portions being joined by a connecting portion, said double-forked means effectively surrounding the brake disk means as well as the brake block means so that each brake block means abuts on each side thereof with at least about half of the lateral surfaces thereof against one of said last-mentioned further leg portions, and spring means extending between and operatively connected to said two of said further leg portions, said spring means urging said brake clamp means in a direction radially inward of said disk means and against said connecting portion.

4. A disk brake for braking the wheel of a vehicle, especially for motor vehicles, comprising:
brake disk means adapted to be secured within the area of the outer circumference thereof at the wheel to be braked,
brake clamp means surrounding said brake disk means inwardly thereof,
brake block means provided with brake lining means,
said brake clamp means including leg portions supporting said brake block means,
actuating means for said brake block means disposed only on one side of said brake disk means including cylinder means slidingly receiving therein two mutually oppositely disposed piston means,
a relatively fixed part for supporting thereon the brake clamp means,
and connecting means for supporting said brake clamp means at said relatively fixed part including double-forked means provided with further leg portions, two of said further leg portions being joined by a connecting portion, said double-forked means effectively surrounding the brake disk means as well as the brake block means so that each brake block means abuts on each side thereof with at least about half of the lateral surfaces thereof against one of said last-mentioned further leg portion, and spring means operatively connected to said two of said further leg portions and urging said brake clamp means along a path radially spaced from said brake disk means,
said cylinder means being securely connected with said connecting means at the further leg portions thereof disposed on said one side.

5. A disk brake for braking the wheel of a vehicle, especially for motor vehicles, comprising:
brake disk means having an inner and an outer circumference and being adapted to be secured within the area of said outer circumference at the wheel to be braked,
brake clamp means surrounding said brake disk means inwardly thereof,
brake block means provided with brake lining means,
said brake clamp means including leg portions supporting said brake block means, one of said leg portions comprising a portion disposed radially inward of said inner circumference,
actuating means for said brake block means disposed only on one side of said brake disk means,
a relatively fixed part for supporting thereon the brake clamp means,
and connecting means for supporting said brake clamp means at said relatively fixed part including double-forked means provided with further leg portions, two of said further leg portions being joined by a connecting portion, said double-forked means effectively surrounding the brake disk means as well as the brake block means so that each brake block means abuts on each side thereof with at least about half of the lateral surfaces thereof against one of said last-mentioned leg portions,
and spring means normally urging said brake clamp means into constant abutment against said connecting portion while leaving sufficient play to said brake clamp means with respect to said connecting means for purposes of self-adjustment of said brake block means with respect to said brake disk means.

6. A disk brake for braking the wheel of a vehicle, especially for motor vehicles, comprising:
brake disk means having an inner and an outer circumference and being adapted to be secured within the area of said outer circumference at the wheel to be braked,
brake clamp means surrounding said brake disk means inwardly thereof,
brake block means provided with brake lining means,
said brake clamp means including leg portions supporting said brake block means,
actuating means for said brake block means disposed only on one side of said brake disk means,
a relatively fixed part for supporting thereon the brake clamp means,
and connecting means for supporting said brake clamp means at said relatively fixed part including double-forked means provided with further leg portions effectively surrounding the brake disk means as well as the brake block means so that each brake block means abuts on each side thereof with at least about half of the lateral surfaces thereof against one of said last-mentioned further leg portions,
and spring means normally urging said brake clamp means into constant abutment against an abutment surface provided therefore in one of the two parts consisting of said relatively fixed part and said connecting means while leaving sufficient play to said brake clamp means with respect to said connecting means for purposes of self-adjustment of said brake block means with respect to said brake disk means,
said connecting means effectively forming at least in part a slot extending transversely to said brake disk means and serving for the passage of said brake clamp means, said first-mentioned slot being deeper than a further slot effectively provided in said connecting means and extending substantially within the plane of said brake disk means,
said spring means urging said brake clamp means inwardly against the bottom of said first-mentioned slot which serves as abutment surface therefor.

7. A disk brake for braking the wheel of a vehicle, especially for motor vehicles, comprising:
brake disk means adapted to be secured within the area of the outer circumference thereof at the wheel to be braked, brake clamp means surrounding said brake disk means inwardly thereof, brake block means provided with break lining means, said brake clamp means including leg portions supporting said brake block means, actuating means for said brake block means disposed only on one side of said brake disk means, a relatively fixed part for supporting thereon the brake clamp means, and connecting means for supporting said brake clamp means at said relatively fixed part including double-forked means provided with further leg portions effectively surrounding the brake disk means as well as the brake block means so that each brake block means abuts on each side thereof with at least about half of the lateral surfaces thereof against one of said last-mentioned further leg portions, and spring means normally urging said brake clamp means into constant abutment against an abutment surface provided therefor in one of the two parts consisting of said relatively fixed part and said connecting means while leaving sufficient play to said brake clamp means with respect to said connecting means for purposes of self-adjustment of said brake block means with respect to said brake disk means, said connecting means effectively forming at least in part a slot extending transversely to said brake disk means and serving for the passage of said brake clamp means, said first-mentioned slot being deeper than a further slot effectively provided in said connecting means and extending substantially within the plane of said brake disk means, said spring means being formed by a leaf spring extending substantially parallelly to the plane of said brake disk means within a slot provided within said brake clamp means and urging said brake clamp means inwardly against the bottom of said first-mentioned slot which serves as abutment surface therefor, the free ends of said leaf spring being secured at pin members provided on said connecting means.

8. A disk brake for braking the wheel of a vehicle, especially for motor vehicles, comprising:

brake disk means having an inner and an outer circumference and being adapted to be secured within the area of said outer circumference at the wheel to be braked, brake clamp means surrounding said brake disk means inwardly thereof, brake block means provided with brake lining means, said brake clamp means including leg portions supporting said brake block means, one of said leg portions comprising a portion disposed radially inward of said inner circumference, actuating means for said brake block means disposed only on one side of said brake disk means, a relatively fixed part for supporting thereon the brake clamp means, and connecting means for supporting said brake clamp means at said relatively fixed part including double-forked means formed by two forked pieces and provided with further leg portions effectively surrounding the brake disk means as well as the brake block means so that each brake block means abuts on each side thereof with at least about half of the lateral surfaces thereof against one of said last-mentioned further leg portions, and spring means normally urging said brake clamp means into constant abutment against an abutment surface provided therefore in said relatively fixed part while leaving sufficient play to said brake clamp means with respect to said connecting means for purposes of self-adjustment of said brake block means with respect to said brake disk means, said abutment surface and forked pieces effectively defining a slot extending transversely to said brake disk means and serving for the passage of said brake clamp means, said abutment surface being a surface at one end portion of said slot, and said spring means formed by a leaf spring urging said brake clamp means against said abutment surface.

9. A disk brake for braking the wheel of a vehicle, especially for motor vehicles, comprising:

brake disk means adapted to be secured within the area of the outer circumference thereof at the wheel to be braked, brake clamp means surrounding said brake disk means inwardly thereof, brake block means provided with brake lining means, said brake clamp means including leg portions supporting said brake block means, actuating means for said brake block means including cylinder means slidingly receiving therein two mutually oppositely disposed piston means, a relatively fixed part for supporting thereon the brake clamp means, and connecting means for supporting said brake clamp means at said relatively fixed part including double-forked means provided with further leg portions, two of said further leg portions being joined by a connecting portion, said double-forked means effectively surrounding the brake disk means as well as the brake block means so that each brake clock means abuts on each side thereof with at least about half of the lateral surfaces thereof against one of said last-mentioned further leg portions, spring means for urging said brake clamp means into engagement with said connecting portion, and hand-brake actuating means for said disk brake including lever means pivotally secured at said brake clamp means, plunger means extending through a part of said brake clamp means and through one of said piston means and being provided with a head portion at one end thereof in abutting engagement with the other piston means, the other outer end of said plunger means engaging with said lever means.

10. A disk brake for braking the wheel of a vehicle, especially for motor vehicles, comprising:

brake disk means adapted to be secured within the area of the outer circumference thereof at the wheel to be braked, brake clamp means surrounding said brake disk means inwardly thereof, brake block means provided with brake lining means, said brake clamp means including leg portions supporting said brake block means, actuating means for said brake block means including cylinder means slidingly receiving therein two mutually oppositely disposed piston means, a relatively fixed part for supporting thereon the brake clamp means, and connecting means for supporting said brake clamp means at said relatively fixed part including double-forked means provided with further leg portions, two of said further leg portions being joined by a connecting portion, said double-forked means effectively surrounding the brake disk means as well as the brake block means so that each brake block means abuts on each side thereof with at least about half of the lateral surfaces thereof against one of said last-mentioned further leg portions, leaf spring means urging said brake clamp means into engagement with said connecting portion, and hand-brake actuating means for said disk brake including lever means pivotally secured at said brake clamp means, plunger means extending through a part of said brake clamp means and through one of said piston means and being provided with a head portion at one end thereof in abutting engagement with the other piston means, the other end of said plunger means engaging with said lever means, and a Bowden cable consisting of an inner and outer part with one part thereof secured at said brake clamp means and with the other part thereof engaging said lever means as abutment therefor.

11. A disk brake for braking the wheel of a vehicle, especially for motor vehicles, comprising:
   brake disk means adapted to be secured within the area of the outer circumference thereof at the wheel to be braked,
   brake clamp means surrounding said brake disk means inwardly thereof,
   brake block means provided with brake lining means,
   said brake clamp means including leg portions supporting said brake block means,
   actuating means for said brake block means disposed only on one side of said brake disk means including cylinder means slidingly receiving therein two mutually oppositely disposed piston means having piston rods,
   a relatively fixed part for supporting thereon the brake clamps means,
   and connecting means for supporting said brake clamp means at said relatively fixed part including double-forked means provided with further leg portions, two of said further leg portions being joined by a connecting portion, said double-forked means effectively surrounding the brake disk means as well as the brake block means so that each brake block means abuts on each side thereof with at least about half of the lateral surfaces thereof against one of said last-mentioned further leg portions, and spring means cooperating with said two further leg portions for urging said brake clamp means against said connecting portion,
   said cylinder means being coverless and being closed off at both ends thereof exclusively by rubber packing means which are secured outwardly thereof at the cylinder means and inwardly thereof at one of two parts constituted by said piston rods and intermediate pieces.

12. A disk brake for braking the wheel of a vehicle, especially for motor vehicles, comprising:
   brake disk means having an inner and an outer circumference and being adapted to be secured within the area of said outer circumference at the wheel to be braked,
   brake clamp means surrounding said brake disk means inwardly thereof,
   brake block means provided with brake lining means,
   said brake clamp means including leg portions supporting said brake block means, one of said leg portions comprising a portion disposed radially inward of said inner circumference,
   actuating means for said brake block means disposed only on one side of said brake disk means,
   a relatively fixed part forming an axle carrier for supporting thereon the brake clamp means,
   and connecting means for supporting said brake clamp means at said relatively fixed part including double-forked means provided with further leg portions, two of said further leg portions being joined by a connecting portion, said double-forked means effectively surrounding the brake disk means as well as the brake block means so that each brake block means abuts on each side thereof with at least about half of the lateral surfaces thereof against one of said last-mentioned further leg portions, said brake clamp means having aperture means, spring means disposed in said aperture means and urging said brake clamp means against said connecting portion,
   said connecting means including further a flange-like portion, an annular portion forming part of said axle carrier, and bearing means having inner and outer bearing races accommodated within said annular portion, for supporting an axle shaft.

13. A disk brake for braking the wheel of a vehicle, especially for motor vehicles, comprising:
   brake disk means having an inner and an outer circumference and being adapted to be secured within the area of said outer circumference at the wheel to be braked,
   brake clamp means surrounding said brake disk means inwardly thereof,
   brake block means provided with brake lining means,
   said brake clamp means including leg portions supporting said brake block means, one of said leg portions comprising a portion disposed radially inward of said inner circumference,
   actuating means for said brake block means disposed only on one side of said brake disk means,
   a relatively fixed part forming an axle carrier for supporting thereon the brake clamp means,
   and connecting means for supporting said brake clamp means at said relatively fixed part including double-forked means provided with further leg portions, two of said further leg portions being joined by a connecting portion, said double-forked means effectively surrounding the brake disk means as well as the brake block means so that each brake block means abuts on each side thereof with at least about half of the lateral surfaces thereof against one of said last-mentioned further leg portions, and spring means in contact with said brake clamp means and said two further leg portions to urge said brake clamp means against said connecting portion,
   said connecting means including further a flange-like portion, an annular portion forming part of said axle carrier, and bearing means having inner and outer bearing races accommodated within said annular portion, for supporting an axle shaft, and an elastic ring element interposed between the outer race of said bearing means and said annular portion.

14. A disk brake for braking the wheel of a vehicle, especially for motor vehicles, comprising:
   brake disk means adapted to be secured within the area of the outer circumference thereof at the wheel to be braked,
   brake clamp means surrounding said brake disk means inwardly thereof,
   brake block means provided with brake lining means,
   said brake clamp means including leg portions supporting said brake block means,
   actuating means for said brake block means disposed only on one side of said brake disk means including cylinder means slidingly receiving therein two mutually oppositely disposed piston means having piston rods,
   a relatively fixed part forming an axle carrier for supporting thereon the brake clamp means,
   and connecting means for supporting said brake clamp means at said relatively fixed part including double-forked means provided with further leg portions effectively surrounding the brake disk means as well as the brake block means so that each brake block means abuts on each side thereof with at least about half of the lateral surfaces thereof against one of said last-mentioned further leg portions,
   spring means normally urging said brake clamp means into constant abutment against an abutment surface provided therefor in one of the two parts consisting of said relatively fixed part and said connecting means while leaving sufficient play to said brake clamp means with respect to said connecting means for purposes of self-adjustment of said brake block means with respect to said brake disk means,
   said connecting means effectively defining at least in part a slot extending transversely to said brake disk means and serving for the passage of said brake clamp means, said first-mentioned slot being deeper than a further slot effectively provided in said connecting means and extending substantially within the plane of said brake disk means, hand-brake actuating means for said disk brake including lever means pivotally secured at said brake clamp means, plunger means extending through a part of said brake clamp means and through one of said piston means and being provided with an enlarged head portion at one end thereof in abutting engagement with the other piston means, the other outer end of said plunger means engaging with said lever means, and a Bowden cable consisting of two parts with one part thereof secured at said brake clamp means and with the other part thereof engaging said lever means as abutment therefor, said cylinder means being coverless and being closed off at both ends thereof exclusively by rubber packing means which are secured outwardly thereof at the cylinder means and inwardly thereof at one of two parts constituted by said piston rods and intermediate pieces, said connecting means including further a flange-like portion, an annular portion forming part of said axle carrier, and bearing means having inner and outer bearing races accommodated within said annular portion, for supporting an axle shaft, and an elastic ring element interposed between the outer race of said bearing means and said annular portion.

15. A disk brake for braking the wheel of a vehicle, especially for motor vehicles, comprising:

brake disk means adapted to be secured within the area of the outer circumference thereof at the wheel to be braked, brake clamp means surrounding said brake disk means inwardly thereof, brake block means provided with brake lining means, said brake clamp means including leg portions supporting said brake block means, actuating means for said brake block means including cylinder means slidingly receiving therein two mutually oppositely disposed piston means, a relatively fixed part for supporting thereon the brake clamp means, and connecting means for supporting said brake clamp means at said relatively fixed part including double-forked means provided with further leg portions effectively surrounding the brake disk means as well as the brake block means so that each brake block means abuts on each side thereof with at least about half of the lateral surfaces thereof against one of said last-mentioned further leg portions, spring means normally urging said brake clamp means into constant abutment against an abutment surface provided therefor in one of the two parts consisting of said relatively fixed part and said connecting means while leaving sufficient play to said brake clamp means with respect to said connecting means for purposes of self-adjustment of said brake block means with respect to said brake disk means, said connecting means effectively forming at least in part a slot extending transversely to said brake disk means and serving for the passage of said brake clamp means, said first-mentioned slot being deeper than a further slot effectively provided in said connecting means and extending substantially within the plane of said brake disk means, said spring means being formed by a leaf spring extending substantially parallelly to the plane of said brake disk means within a slot provided within said brake clamp means, and hand-brake actuating means for said disk brake including lever means pivotally secured at said brake clamp means, plunger means extending through a part of said brake clamp means and through one of said piston means and being provided with a head portion at one end thereof in abutting engagement with the other piston means, the other end of said plunger means engaging with said lever means, said cylinder means being coverless and being closed off at both ends thereof exclusively by rubber packing means which are secured outwardly thereof at the cylinder means and inwardly thereof at one of two parts constituted by piston rods and intermediate pieces, and said connecting means including further a flange-like portion, an annular portion forming part of the relatively fixed part constituting an axle carrier, bearing means having inner and outer races and accommodated within said annular portion, for supporting therein an axle shaft, and an elastic ring element interposed between the outer race of said bearing means and said annular portion.

16. A disk brake for braking the wheel of a vehicle, especially for motor vehicles, comprising:

brake disk means adapted to be secured within the area of the outer circumference thereof at the wheel to be braked, brake clamp means surrounding said brake disk means inwardly thereof, brake block means provided with brake lining means, said brake clamp means including leg portions supporting said brake block means, actuating means for said brake block means including cylinder means slidingly receiving therein two mutually oppositely disposed piston means, a relatively fixed part for supporting thereon the brake clamp means, and connecting means for supporting said brake clamp means at said relatively fixed part including double-forked means provided with further leg portions effectively surrounding the brake disk means as well as the brake block means so that each brake block means abuts on each side thereof with at least about half of the lateral surfaces thereof against one of said last-mentioned further leg portions, spring means normally urging said brake clamp means into constant abutment against an abutment surface provided therefor in one of the two parts consisting of said relatively fixed part and said connecting means while leaving sufficient play to said brake clamp means with respect to said connecting means for purposes of self-adjustment of said brake block means with respect to said brake disk means, said connecting means effectively forming at least in part a slot extending transversely to said brake disk means and serving for the passage of said brake clamp means, said first-mentioned slot being deeper than a further slot effectively provided in said connecting means and extending substantially within the plane of said brake disk means, said spring means being formed by a leaf spring extending substantially parallelly to the plane of said brake disk means within a slot provided within said brake clamp means, and hand-brake actuating means for said disk brake including lever means pivotally secured at said brake clamp means, plunger means extending through a part of said brake clamp means and through one of said piston means and being provided with a head portion at one end thereof in abutting engagement with the other piston means, the other end of said plunger means engaging with said lever meas, said cylinder means being coverless and being closed off at both ends thereof exclusively by rubber packing means which are secured outwardly thereof at the cylinder means and inwardly thereof at one of two parts constituted by piston rods and intermediate pieces.

17. A disk brake for braking the wheel of a vehicle, especially for motor vehicles, comprising:

brake disk means adapted to be secured within the area of the outer circumference thereof at the wheel to be braked, brake clamp means surrounding said brake disk means inwardly thereof, brake block means provided with brake lining means, said brake clamp means including leg portions supporting said brake block means, actuating means for said brake block means including cylinder means slidingly receiving therein two mutually oppositely disposed piston means, a relatively fixed part for supporting thereon the brake clamp means, and connecting means for supporting said brake clamp means at said relatively fixed part including double-forked means provided with further leg portions effectively surrounding the brake disk means as well as the brake block means so that each brake block means abuts on each side thereof with at least about half of the lateral surfaces thereof against one of said last-mentioned further leg portions, spring means normally urging said brake clamp means into constant abutment against an abutment surface provided therefor in one of the two parts consisting of said relatively fixed part and said connecting means while leaving sufficient play to said brake clamp means with respect to said connecting means for purposes of self-adjustment of said brake block means with respect to said brake disk means, said connecting means effectively forming at least in part a slot extending transversely to brake disk means and serving for the passage of said brake clamp means, said first-mentioned slot being deeper than a further slot effectively provided in said connecting means and extending substantially within the plane of said brake disk means, said spring means being formed by a leaf spring extending substantially parallelly to the plane of said brake disk means within a slot provided within said brake clamp means, and hand-brake actuating means for said disk brake including lever means pivotally secured at said brake clamp means, plunger means extending through a part of said brake clamp means and through one of said piston means and being provided with a head portion at one end thereof in abutting engagement with the other piston means, the other end of said plunger means engaging with said lever means, and said connecting means including further a flange-like portion, an annular portion forming part of the relatively fixed part constituting an axle carrier, bearing means having inner and outer races and accommodated within said annular portion, for supporting therein an axle shaft, and an elastic ring element interposed between the outer race of said bearing means and said annular portion.

18. A disk brake for braking the wheel of a vehicle, especially for motor vehicles, comprising:

brake disk means adapted to be secured within the area of the outer circumference thereof at the wheel to be braked, brake clamp means surrounding said brake disk means inwardly thereof, brake block means provided with brake lining means, said brake clamp means including leg portions supporting said brake block means, actuating means for said brake block means disposed only on one side of said brake disk means including cylinder means slidingly receiving therein two mutually oppositely disposed piston means, a relatively fixed part for supporting thereon the brake clamp means, and connecting means for supporting said brake clamp means at said relatively fixed part including double-forked means provided with further leg portions effectively surrounding the brake disk means as well as the brake block means so that each brake block means abuts on each side thereof with at least about half of the lateral surfaces thereof against one of said last-mentioned further leg portions, and spring means normally urging said brake clamp means into constant abutment against an abutment surface provided therefor in one of the two parts consisting of said relatively fixed part and said connecting means while leaving sufficient play to said brake clamp means with respect to said connecting means for purposes of self-adjustment of said brake block means with respect to said brake disk means, said connecting means effectively forming at least in part a slot extending transversely to said brake disk means and serving for the passage of said brake clamp means, said first-mentioned slot being deeper than a further slot effectively provided in said connecting means and extending substantially within the plane of said brake disk means, said spring means urging said brake clamp means inwardly against the bottom of said first-mentioned slot which serves as abutment surface therefor, hand-brake actuating means for said disk brake including lever means pivotally secured at said brake clamp means, plunger means extending through a part of said brake clamp means and through one of said piston means and being provided with an enlarged head portion at one end thereof in abutting engagement with the other piston means, the other end of said plunger means engaging with said lever means, and a Bowden cable with one part thereof secured at said brake clamp means and with the other part thereof engaging said lever means as abutment therefor.

References Cited by the Examiner

UNITED STATES PATENTS

| | | | |
|---|---|---|---|
| 2,185,003 | 12/1939 | Stoddard | 188—152 X |
| 2,777,540 | 1/1957 | Bachman | 188—73 |
| 2,820,530 | 1/1958 | Chouings et al. | 188—73 |
| 2,938,349 | 5/1960 | Britton | 188—152 X |
| 2,986,432 | 5/1961 | Schlauch | 308—184 |
| 3,056,472 | 10/1962 | Besseler et al. | 188—73 |
| 3,088,554 | 5/1963 | Desvignes et al. | 188—73 |

FOREIGN PATENTS

| | | |
|---|---|---|
| 1,252,161 | 12/1960 | France. |
| 1,269,737 | 7/1961 | France. |
| 1,270,684 | 7/1961 | France. |
| 714,962 | 9/1954 | Great Britain. |
| 734,271 | 7/1955 | Great Britain. |
| 844,003 | 8/1960 | Great Britain. |

MILTON BUCHLER, *Primary Examiner*.

EUGENE G. BOTZ, ARTHUR L. LA POINT, FERGUS S. MIDDLETON, *Examiners*.

G. E. A. HALVOSA, *Assistant Examiner*.